June 10, 1969  TEISUKE NAGATSU  3,448,946
COMPOUND HELICOPTER

Filed May 4, 1967   Sheet 1 of 6

INVENTOR:
TEISUKE NAGATSU
BY
Buckman and Archer
ATTORNEYS

June 10, 1969  TEISUKE NAGATSU  3,448,946
COMPOUND HELICOPTER

Filed May 4, 1967  Sheet 2 of 6

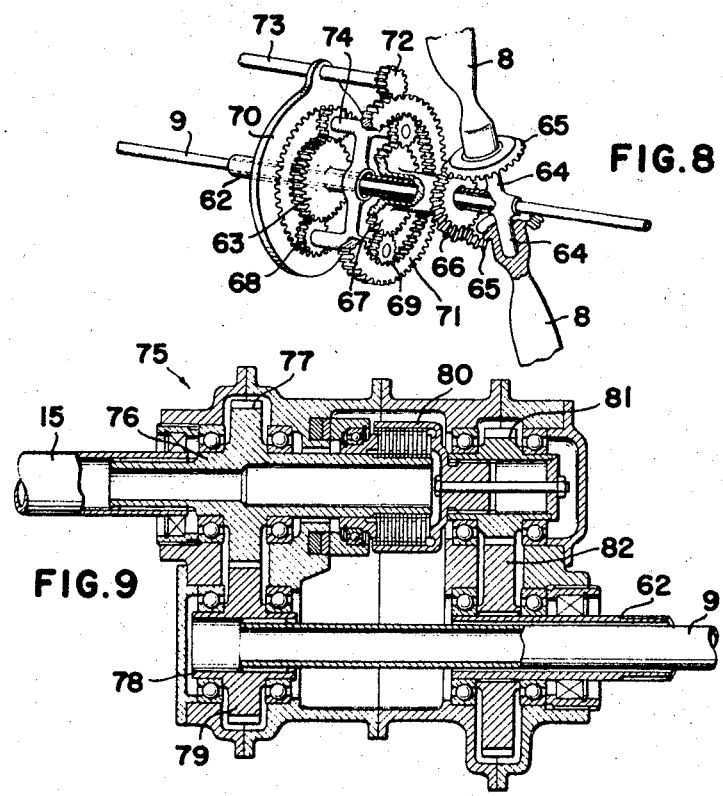
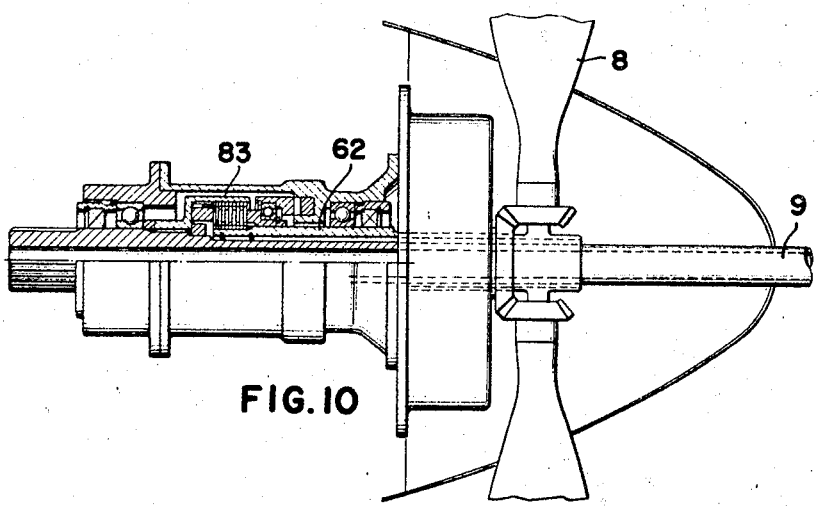

United States Patent Office 3,448,946
Patented June 10, 1969

3,448,946
COMPOUND HELICOPTER
Teisuke Nagatsu, Gifu-shi, Gifu-ken, Japan, assignor to Kawasaki Kokuki Kogyo Kabushiki Kaisha, Kobe-shi, Hyogo-ken, Japan, a corporation of Japan
Filed May 4, 1967, Ser. No. 636,160
Claims priority, application Japan, Sept. 16, 1966, 41/61,002
Int. Cl. B64c 27/08, 27/22, 27/74
U.S. Cl. 244—17.19          10 Claims

ABSTRACT OF THE DISCLOSURE

A compound helicopter having a main rotor for vertical thrust, an independent rotor for forward thrust, and a tail rotor for anti-torque thrust; the tail rotor being driven via a shaft extending in concentric relation to the axis of the independent rotor.

---

The present invention relates to vertical take-off and landing aircraft and more particularly to so-called compound helicopters of the type having a propeller for generating forward thrust, in addition to the main and tail rotors.

In order to increase horizontal forward flying speed of a helicopter, it is generally known to be advantageous to provide means for generating forward thrust, in addition to the main rotor, for the purpose of reducing the forward thrust loading of the main rotor in the high speed region. Helicopters having such forward thrust generating means are generally referred to as thrust augmented helicopters and various types of forward thrust generating means may be employed for this purpose. Where the desired maximum forward flying speed is not extremely high, the use of propellers as the forward thrust generating means is advantageous over the use of a jet propulsion engine from the economical standpoint. In this view, there have already been proposed helicopters which are equipped with a propeller for generating forward thrust. However, substantially all of the prior art helicopters of the type described have a propeller provided at either the forward end of the fuselage, the rear end of the tail boom, or at the leading edge of a fixed wing which is provided for the purpose of reducing the lift loading of the main rotor. In these helicopters, since the weights of the propeller and driving system therefor are distributed at points remote from the center of gravity of the helicopter, not only does the moment of inertia of the helicopter increase but also the movement of the rotational plane of the propeller increases, as a result of movement of the fuselage about its center of gravity, with the tendency of objectionable moment and vibration being generated. Furthermore, heavy equipment arranged remote from the center of gravity of the fuselage makes it extremely difficult to maintain the rigidity of the fuselage structure, which in turn causes vibration or other troubles due to the lowering of natural frequency and deformation of large horsepower, transmitting element. Thus, such mounting is not desirable from the structural standpoint.

Another drawback of the presently available helicopters described, is that when the propeller is provided at the forward end of the fuselage, the propeller not only impairs the front visibility and interferes with the installation of arms in the front portion of the fuselage, but also, the height of the fuselage must be increased in order to prevent collision of the propeller against the main rotor. On the other hand, when the propeller is provided at the rear end of the tail boom, the aforementioned drawbacks common for this type of helicopter become particularly pronounced. In addition, the propeller must be louated at a level substantially high from the ground or otherwise the diameter of the propeller must be reduced, in order to prevent the propeller from striking the ground due to flare during landing. Now, when the propellers are provided on a fixed wing, not only does the power transmission system become complicated but also it is inevitable for the fixed wing to be installed to a lower or intermediate portion of the fuselage so as to avoid the collision of the propeller against the main rotor, and thus the visibility is impaired. In this case, the use of a single propeller obviously renders the helicopter unsymmetrical inviting various difficulties inherent thereto.

Considering the above, it has been found desirable to install the propeller immediately to the rear of either the transmission gear box for the main rotor or the engine mount. However, in the case of a helicopter having an anti-torque tail rotor, the advantages obtained from the installation of a propeller are offset by the fact that the driving system for the tail rotor becomes complicated. To eliminate the tail rotor, therefore, it is conceivable to rotate the main rotor by means of gas ejected from the rotor tips at high velocities, instead of driving it mechanically. Such an arrangement, however, involves many structural problems and is not advantageous when all operating factors are considered.

The present invention has been achieved with a view to eliminating the foregoing drawbacks and has for an object the provision of a helicopter of the type having a main rotor and an anti-torque tail rotor, in which a propeller is installed immediately to the rear of either the transmission or prime mover without substantially complicating the structure.

Another object of the invention is to provide a compound helicopter which is simple and compact in construction.

The present invention will now be described in further detail with reference to the accompanying drawings, in which the present invention is illustrated by way of example and in which:

FIGURE 8 is a perspective view of another mode of installation of the propeller and pitch control mechanism therefor;

FIGURE 9 is a cross section of a gear box in which the propeller driving system is combined in a clutch;

FIGURE 10 is a cross section illustrating another type of clutch combined with the propeller driving system;

Figure 1:
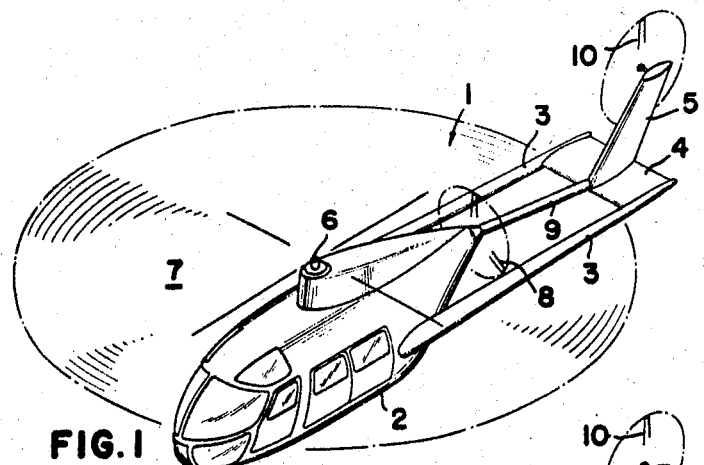
FIGURE 1 is a perspective view of a compound helicopter embodying the present invention.
Figure 2:
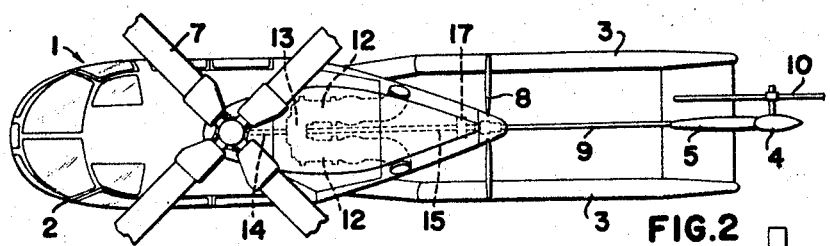
FIGURES 2 and 3 are a plan view and a side elevation respectively of the compound helicopter of FIG. 1, with portions shown in section.
Figure 3:
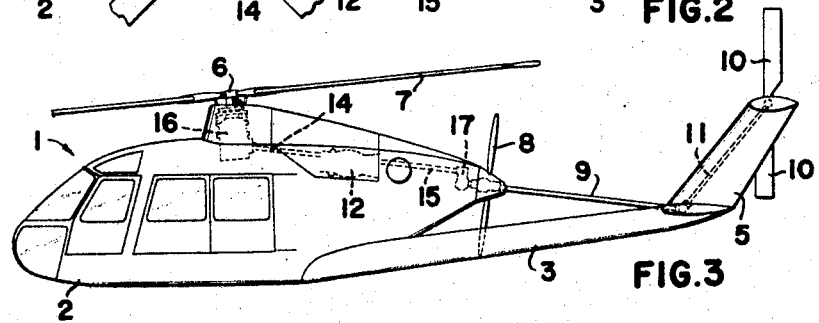

Referring to the drawings and especially to FIGS. 1, 2 and 3 thereof, a helicopter 1 according to the present invention may comprise a fuselage 2, a pair of tail booms 3 extending rearwardly from both sides of the rear portion of said fuselage, a stabilizer 4 provided at the rear ends of said tail booms 3 and a fin 5 mounted in the center of said stabilizer. At substantially the center of the fuselage 2 is provided an upwardly extending driving mast 6, with a main rotor 7 mounted on the top end thereof. A power plant for driving the main rotor 7 through the mast 6 is disposed in the rear upper portion of the fuselage 2 and a propeller 8 is installed to the rear end of the fuselage 2 for generating forward thrust. A driving shaft 9 for a tail rotor 10 is extending rearwardly from the rear end of the fuselage concentrically of the propeller 8 to enter the root portion of the fin 5, wherein it is connected to a driving shaft 11 for driving said tail rotor therethrough, said driving shaft being disposed in said fin 5 substantially vertically.

The power plant includes a pair of gas turbine engines 12 disposed in the rear upper portion of the fuselage 2 and the outputs of these engines 12 are taken out from a power transmission gear box to a mixing gear box 13 through a one-way clutch, from which they are transmitted forwardly and rearwardly by means of driving shafts 14, 15 extending forwardly and rearwardly respectively, to reach a transmission 16 for driving the main rotor and a reduction gear box 17 in the driving system for the propeller 8.

Figure 4:
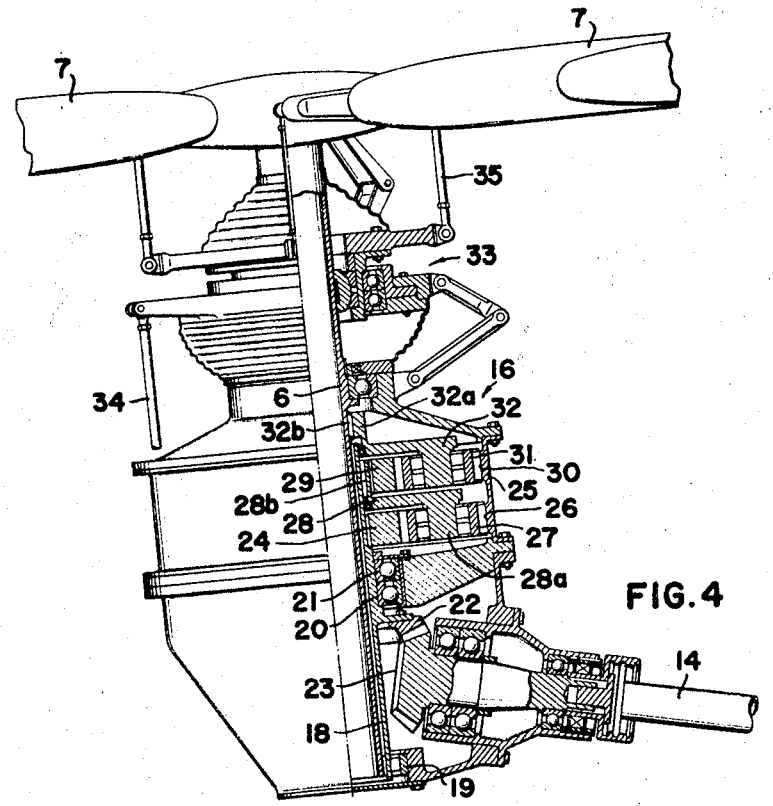
FIGURE 4 is a fragmentary side elevation, with a portion shown in section, of the transmission for driving the main rotor used in the helicopter shown in FIGS. 1 to 3.

The structure of the transmission 16 is shown in detail in FIG. 4. As is seen from the figure, the transmission 16 includes a hollow driving shaft 18 which is supported substantially vertically by bearings 19, 20, 21 and this driving shaft has a bevel gear 22 fixed thereto for engagement with a bevel gear 23 which is connected to the forward driving shaft 14. Power is transmitted to the driving shaft 18 from the driving shaft 14 through the bevel gears 22, 23. The driving shaft 18 is also provided slightly above the bearing 21 with a sun gear 24 which is fixed to said shaft by appropriate means such as a spline. Between the sun gear 24 and a fixed gear 26 provided on a transmission housing 25 is disposed a planet gear 27 in intermeshing relation thereto. The planet gear 27 is rotatably mounted on a supporting shaft 28a on a planet carrier 28 which is rotatably mounted on the driving shaft 18, with a hollow boss 28b formed at the center thereof fitted on said shaft through a bearing. Another sun gear 29 is mounted on the exterior surface of said hollow boss 28b in the same manner as the gear 24. A planet gear 31, which is intermeshing with another fixed gear formed on the interior surface of the housing 25 and said sun gear 29, and a planet carrier 32 carrying said planet gear 31, form another planet gear system. The planet carrier 32 is mounted on the vertical driving shaft 18 with a hollow boss 32a formed at the center thereof fitted on said shaft through a bearing and a spline 32b formed on the inner surface of said hollow boss engages an opposite spline formed on the mast 6. As such, the output of the engine 12 is transmitted from the driving shaft 14 to the mast 6 through the bevel gears 23, 22 and the aforementioned two planet gear systems to drive the main rotor 7.

Indicated at 33 in FIG. 4, is a swash plate assembly whose height and angle of inclination are controlled by a vertical pushing rod 34 which is operatively connected to the control stick in the cockpit. A change in the height and angle of inclination of the swash plate assembly is transmitted to a main rotor pitch control system 35 to vary the cyclic pitch and collective pitch of the main rotor. Since the foregoing system is well known, no further description will be provided herein. The main rotor may be of any known type, such, for example, as articulated type, seesaw type or rigid type.

Figure 5:
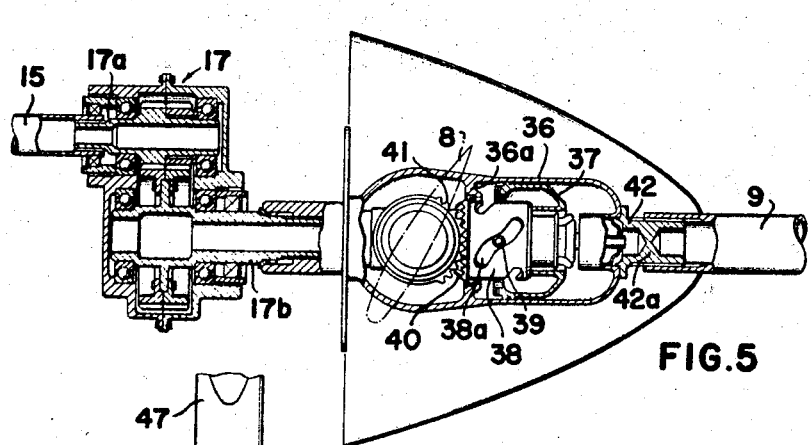
FIGURE 5 is a cross section illustrating the installation of a propeller and pitch control mechanism therefor.

FIG. 5 shows a reduction gear box 17 and propeller fitting and pitch control mechanism in the propeller driving system, together with a portion of the driving shaft 9 for the tail rotor. The gear box 17 is of ordinary construction and its input shaft 17a is connected to the driving shaft 15 by such means as spline, while its output shaft 17b is connected to the propeller driving shaft. The propeller fitting and pitch control mechanism includes a propeller dome 36 and the interior of the dome is divided into right and left chambers by an annular barrier 36a. In the right hand chamber there is a slidably unrotatably disposed piston 37 and the annular barrier 36a has a cam cylinder 38 rotatably fitted therein through a suitable bearing. The cam cylinder 38 is formed with cam slots 38a in which cam follower rollers 39 carried by the piston 37 are received, respectively. The cam cylinder 38 is formed at its left end with a bevel gear 40 which meshes with a segment gear 41 formed at the inner ends of propeller blades 8 connected to the propeller dome 36 through a suitable bearing. The piston 37 is displaced by a pressure difference between the hydraulic pressures introduced into both the right and left chambers in the dome, causing the cam cylinder 38 to be rotated through the engagement of said follower rollers with the respective cam slots 38a and thus the pitch angle of the propeller blades 8 is changed. Such a pitch control mechanism is already known and used for variable pitch propellers on ordinary aircrafts. Alternatively, the well known electric variable pitch propeller may also be used.

Figure 6:
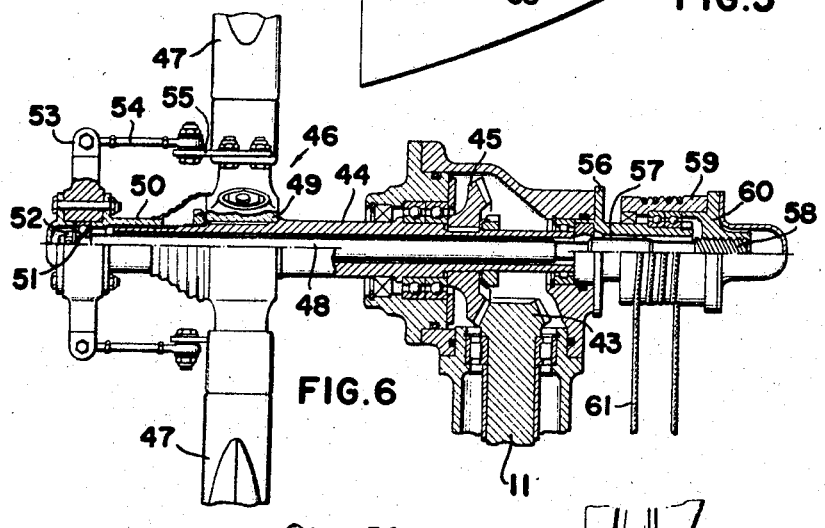
FIGURE 6 is a cross section illustrating the installation of the tail rotor and pitch control mechanism therefor.
Figure 7:
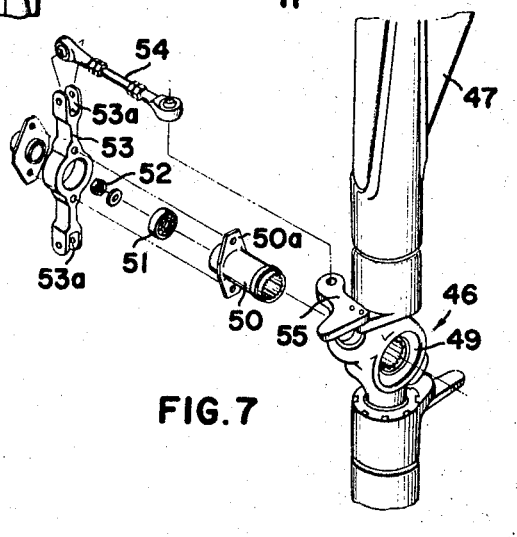
FIGURE 7 is an exploded perspective view of a portion of FIG. 6.

In the embodiment described herein, a cap 42 disposed at the end extremity of the propeller dome 36 carries an extended shaft 42a in concentrical relation to the axis of the propeller, in which the tail rotor driving shaft 9 is connected by means of spline or other suitable means. The driving shaft 9 is connected with a driving shaft 11 in the root portion of the fin by way of ordinary bevel gears. The driving shaft 11 has a bevel gear 43 fixed to the top end thereof which, as shown in FIG. 6, meshes with a bevel gear 45 fixed to a tail rotor shaft 44. At the outer end of the shaft 44 are provided a tail rotor hub assembly 46 and a sleeve 50, which are secured thereto by means, for example, of a spline. A pair of rotor blades 47 is connected to an outer housing 49 of the hub assembly at diametrically opposite locations through a suitable bearing for rotation about the vertical axis thereof. The tail rotor driving system mentioned above, as shown in FIGS. 6 and 7, has incorporated therein a mechanism by means of which the pitch angle of the blades 47 is optionally controlled. This pitch control mechanism for the tail rotor blades includes a pushing rod 48 extending through the interior of the driving shaft 44 and the outer end of said pushing rod extending beyond the driving shaft 44 is journaled in the sleeve 50 through a bearing 51 and connected to said sleeve by a nut 52 in such a manner that it is rotatable relative to the sleeve 50 but is not displaceable axially thereof. The sleeve 50 is axially slidably fitted on the driving shaft 44 and is formed with a flange 50a to which an arm member 53 is secured. The arm member 53 is formed at each end with bifurcated ears 53a to which one end of a pushing rod 54 is pivotally connected. The other end of each pushing rod 54 is pivotally connected to a bracket 55 provided at the root portions of the blades 47 eccentrically of the longitudinal axes of said blades respectively.

The pushing rod 48 is connected at the inner end portion thereof to a fixed support member 56 by means of a spline as indicated at 57 in such a manner that it is slidable axially but not rotatable, and is formed with a screw 58 at the inner end extremity. This screw 58 is in engagement with a nut 60 fixed to a drum 59 which is adapted to be rotated optionally by a cable 61. The cable 61 is extended interior of the fin 5, stabilizer 4 and boom 3, being guided by suitably located pulleys and connected to a control device, such as a control pedal in the cockpit, so that, by operating the pedal, the drum 59 can be rotated as desired. Upon rotation of the drum, the nut 60 which is connected thereto is also rotated at the same time. In this case, since the pushing rod 48 is prevented from rotating by the spline at 57, the pushing rod 48 is moved axially as the nut 60 rotates. Consequently, the sleeve 50 and the arm member 53 fixed thereto are moved in the direction of the rotational axis of the tail rotor with respect to the housing of the hub assembly 46, with the result that the tail rotor blades 47 are rotated about the axes thereof by way of the respective pushing rods 54 and brackets 55, thus enabling the blade pitch angle to be properly adjusted.

The tail rotor driving and pitch control mechanism described above is well known. It should be noted that the mechanism to be used in the present invention is not restricted only to that described above but any other known mechanisms may of course be employed.

As will be understood from the foregoing description, according to the compound helicopter of the invention, in which the forward thrust generating propeller 8 is provided at the most desirable location and also the tail driving shaft 9 extends rearwardly from said propeller in concentrical relation thereto, it is possible to obtain a driving system which is simpler in construction, lighter in weight, cheaper in cost and more reliable than that wherein the tail rotor driving shaft extends, for example, through the boom taking a long way around the propeller.

In operating the helicopter illustrated hereinabove, the forward thrust generated by the propeller 8 is not needed but is rather detrimental for vertical ascending or descending or hovering movement of helicopter. Moreover, it is not desirable to use a large proportion of the power for driving the propeller. Under such condition, therefore, the pitch of the propeller 8 is adjusted to an angle at which no forward thrust is produced. When the helicopter is to fly forward, the pitch angle of the propeller blades is increased to obtain a desired forward thrust. When the helicopter makes a landing by the automatic rotation of the main rotor upon stoppage of the engine, the aforementioned driving system is disconnected from the engine by the one-way clutch but the propeller continues its rotation since it is connected to the tail rotor driving system. Therefore, in this case also, the pitch of the propeller blades is made zero-thrust position so as to minimize the power consumption by the propeller.

Still another arrangement of the propeller fitting and pitch control mechanism is shown in FIG. 8. In this arrangement, the propeller pitch control mechanism consists of two sets of planetary gear systems. A propeller driving shaft 62 is fixed to a sun gear 63 of a first planet gear system and a pair of support shafts 64 extending in the diametrically opposite directions is fitted on one end of said driving shaft 62, each of said support shafts having a propeller blade 8 fitted thereon for rotation about the axis thereof. At the root portion of each propeller blade 8 is provided a bevel gear 65 for meshing with a bevel gear 66 which is rotatably fitted on the driving shaft 62. Formed integrally with the bevel gear 66 is a sun gear 67 of the second planet gear system. The gears 63 and 67 have the same diameter and the same number of teeth and are meshed with pinions or planet gears 68 and 69 respectively which have the same diameter and the same number of teeth, said pinions 68 and 69 mesh with outer gears 70 and 71 respectively. The outer gear 70 is secured to the fuselage frame, not shown, while the gear 71 has teeth formed on the exterior surface thereof for meshing with a pinion 72 which is adapted to be rotated by a shaft 73. The pinions or planet gears 68, 69 of the first and second planet gear systems are supported by a common planet gear carrier 74 and the number of internal teeth of the gear 71 is equal to that of the gear 70.

With the construction described above, when the shaft 62 is driven to rotate the propeller 8, the gear 63 is also driven at the same rate in the same direction and the rotational force thereof is transmitted through the pinions 68, pinion carrier 74 and pinions 69 to the sun gear 67, causing it to rotate also at the same rate in the same direction, with the bevel gear 66 rotating similarly. As such, the propeller 8 is rotated with the pitch angle remaining unchanged. Now, when the shaft 73 is rotated under this condition, the outer gear 71 is displaced by the pinion 72 and thus the propeller pitch angle is varied due to the relative displacement of the bevel gear 66.

In the embodiment described, the tail rotor driving shaft 9 is disposed extending through the interior of the propeller driving shaft 62. In this case, the propeller driving and pitch control mechanism is not necessarily composed as described previously with reference to FIG. 5. An electric system may also be employed.

In FIG. 9 there is shown a gear box 75, as a substitution for the reduction gear box 17, which is adapted for use in combination with a driving system of the type in which, as shown, for example, in FIG. 8, the tail rotor driving shaft extends through the interior of the propeller driving shaft. In the figure, the driving shaft 15 for transmitting the power of the engine is connected to one end of the primary gear shaft 76 in the gear box 75 by means, for example, of a spline, and a gear 77 mounted on said primary gear shaft 76 meshes with a gear 79 on the secondary gear shaft 78 which is connected to one end of the tail rotor driving shaft 9. The other end of the primary gear shaft 76 is connected through a hydraulic multiple disc clutch 80 to the primary propeller driving gear 81 which meshes with the secondary gear 82 fixed on the propeller driving shaft 62.

The use of this gear box 75 is advantageous in that the propeller driving shaft 62 and the tail rotor driving shaft 9 may be driven at different rotational frequencies and also in that the propeller may be stopped by disconnecting the clutch 80 when the propeller is not required to be driven, such as in the case of vertical ascending or descending, hovering or auto-rotation of the main rotor, and thereby it is possible to avoid wasteful consumption of the power by the propeller.

FIG. 10 shows an other arrangement of the propeller driving system combined with a clutch. In the arrangement shown, the output shaft 17b is connected to the tail rotor driving shaft 9 by way of the reduction gear box shown in FIG. 5 and the tail rotor driving shaft 9 is in turn connected to the propeller driving shaft 62 through a clutch 83.

In another embodiment of the present invention, the propeller driving shaft 62 is connected directly to the output shaft of the engine, and the main rotor and tail rotor are connected to the engine output shaft through a one-way clutch. In this way, since the engine and propeller stop at the time of auto-rotation, there is no need of providing a clutch separately. In this case, the propeller is preferably feathered. It should be noted however that with the arrangement described, the pitch of the propeller must be reduced to produce no thrust during ascending, descending or hovering movement of the helicopter.

In all of the embodiments described hereinabove, since the propeller driving shaft is driven in mechanical connection with the main rotor driving shaft, the rotational frequency thereof is determined by the rotational frequency of the main motor. Therefore, it will be understood that the pitch of the propeller cannot be controlled in the manner in which the pitch of a constant propeller of ordinary fixed wing aircraft is controlled. In order to solve this problem, it is convenient to control the pitch such that the propeller absorbs a predetermined horsepower. This may be achieved in two ways, i.e. one is by measuring an air speed and controlling the pitch angle in accordance therewith and the other is by measuring the propeller torque in terms, for example, of oil pressure, using a conventional torque meter and controlling the propeller pitch such that the torque value measured reaches a predetermined value.

Figure 11:
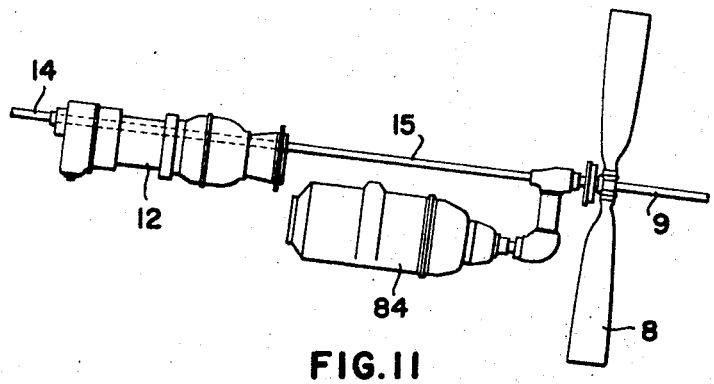
FIGURE 11 is a schematic side view of an arrangement in which a separate prime mover is provided for driving the propeller.

FIG. 11 shows the case wherein a propeller driving engine is provided separately from the engine 12. In this arrangement, the output of the propeller driving gas turbine engine 84 is transmitted to the propeller driving shaft 62, while the main and tail rotors are driven from the engine 12. This arrangement is advantageous in that the propeller 8 may be controlled independently of the main rotor.

Figure 13:
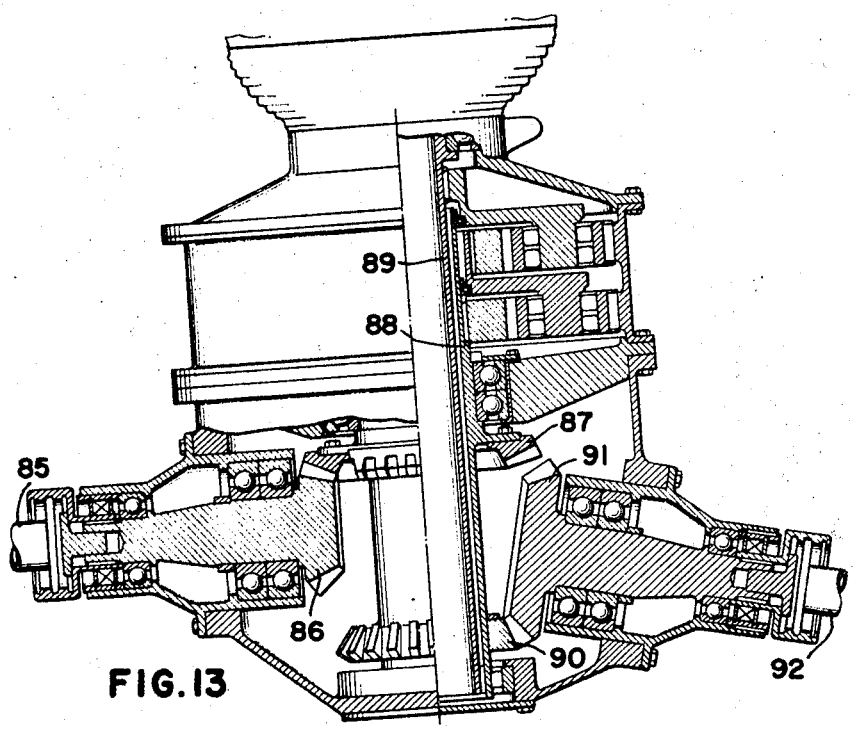
FIGURE 13 is a side elevation, with a portion shown in section, of the transmission used in the arrangement shown in FIG. 12.
Figure 12:
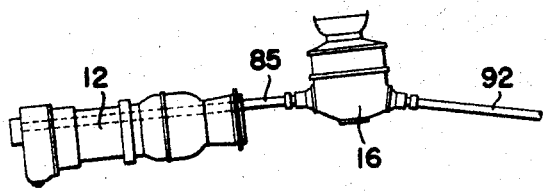
FIGURE 12 is a schematic side view of another arrangement in which a gas turbine engine is located at a different point.

FIGS. 12 and 13 show the arrangement in which the engine 12 is arranged in front of the transmission 16. The output of the engine 12 is transmitted through an output shaft 85 to the transmission 16 to drive a vertical driving shaft 88 through bevel gears 86, 87 and thence to a main rotor driving mast 89 through double planet gear systems to drive the same and also to a propeller and tail rotor driving shaft 92 through a bevel gear 91 to drive the same.

Figure 14:
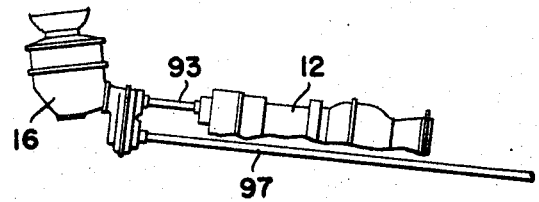
FIGURE 14 is a schematic side elevation of another type of the driving system.
Figure 15:
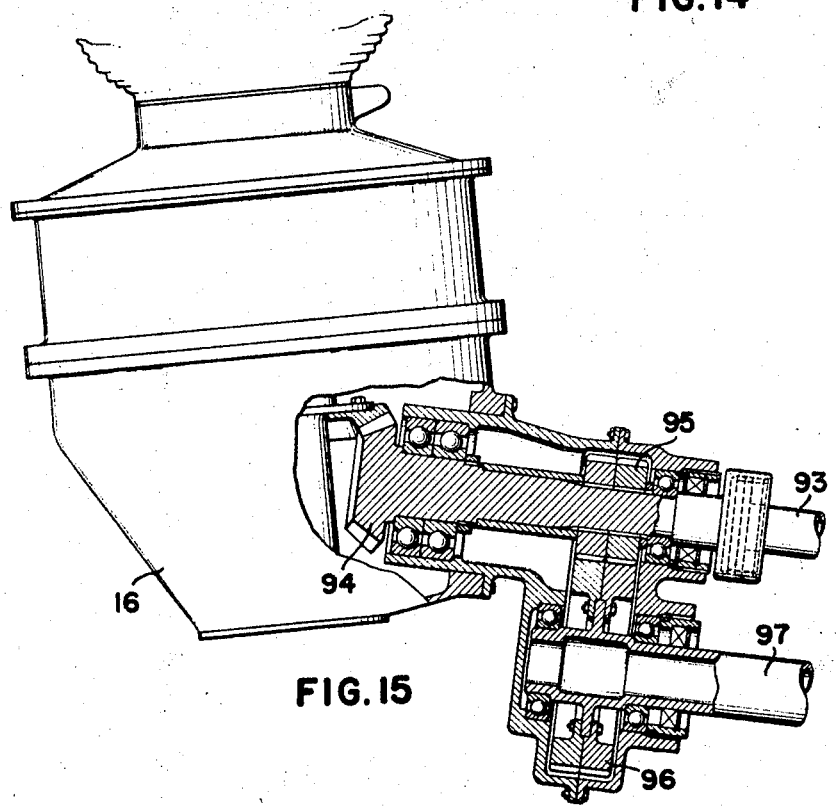
FIGURE 15 is an enlarged cross section of the gear box employed in the arrangement shown in FIG. 14.

Still another arrangement of the driving shaft is shown in FIGS. 14 and 15. In this arrangement, the output of the engine 12 is transmitted to the transmission 16 through an output shaft 93 and a bevel gear 94 and also to a propeller and tail rotor driving shaft 97 through gears 95 and 96.

Figure 16:
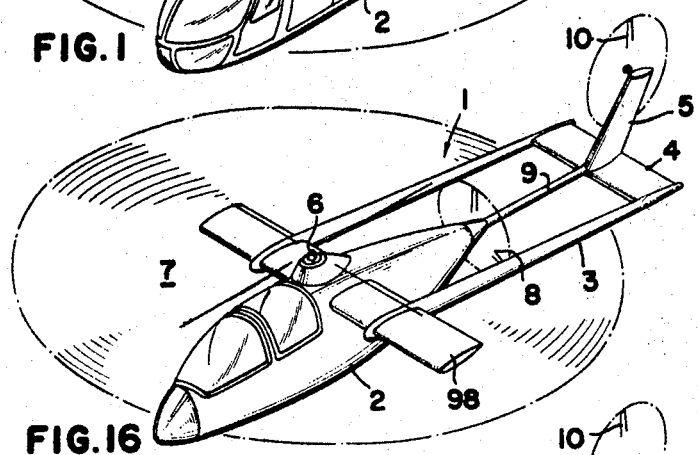
FIGURES 16 and 17 are perspective views, similar to FIG. 1, of other forms of compound helicopter in which a driving system similar to that used in the helicopter shown in FIG. 1 may be used.
Figure 17:
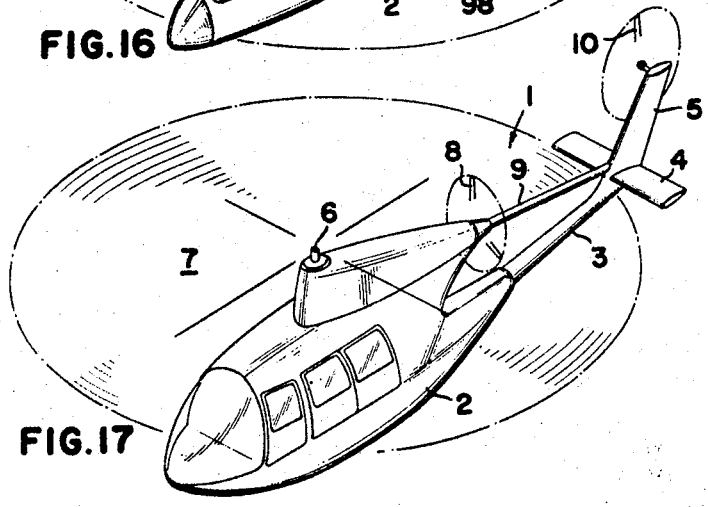

FIGS. 16 and 17 respectively are perspective views of other types of the compound helicopter shown in FIG. 1, in which like numerals represent the like parts. FIG. 16 shows a type in which the fuselage 2 is provided with a fixed wing, whereas FIG. 17 shows a type which has only one tail boom. As will be appreciated, the helicopters shown in FIGS. 1, 16 and 17 may have the same power system. In other words, the present invention has the advantage that, when a power system adapted for use with the helicopter of the type shown in FIG. 1 has once been developed, the same power system may also be employed as such in other helicopters of substantially the same performance.

It should of course be understood that, although the description herein has been given in detail with reference to specific embodiments of the invention, the present invention is not restricted thereto but many modifications and changes are possible without deviating from the scope of the invention.

What I claim is:

1. A compound helicopter comprising a fuselage, a main rotor on said fuselage disposed to provide vertical thrust, means for rotating said main rotor, forward thrust means mounted at the read end of said fuselage, a tail boom extending rearwardly from said fuselage, an anti-torque tail rotor supported in proximity to the rear end of said boom, and driving means for said anti-torque tail rotor extending through the axis of said forward thrust means.

2. A compound helicopter according to claim 1, wherein said forward thrust means is rotatably mounted, a rotatable drive shaft interconnects said driving means and said forward thrust means, and a drive shaft for said tail rotor extends rearwardly in concentric relation to said forward thrust means to drive said tail rotor.

3. A compound helicopter according to claim 2, wherein said main rotor and forward thrust means are propellers.

4. A compound helicopter according to claim 3, wherein a common source of power is used to drive said main rotor, said forward thrust means, and said tail rotor.

5. A compound helicopter according to claim 4, wherein said main rotor and forward thrust means are individually disconnectable from said common source of power.

6. A compound helicopter according to claim 4, wherein said forward thrust means is directly connected to said common source of power and said main rotor and tail rotor are connected to said common source of power via a one-way clutch.

7. A compound helicopter according to claim 4, wherein said common source of power is connected to said main rotor and said forward thrust means via a one-way clutch.

8. A compound helicopter according to claim 7, including gear means coupled between said one-way clutch and said forward thrust means, and a drive shaft extending from said gear reduction means to said anti-torque tail rotor, and drive shaft extending in concentric relation to the axis rotation of said forward thrust means.

9. A compound helicopter according to claim 8, including means for controlling the pitch of said propellers.

10. A compound helicopter accordnig to claim 9, wherein the pitch of the propeller of the forward thrust means is controlled to absorb a predetermined horespower.

References Cited

UNITED STATES PATENTS

| | | | |
|---|---|---|---|
| 2,547,255 | 4/1951 | Bruel | 244—17.19 |
| 2,698,147 | 12/1954 | Hovgard | 244—7 |
| 3,116,036 | 12/1963 | Nichols | 244—17.19 X |
| 3,211,235 | 10/1965 | Bretl | 244—17.19 X |

FOREIGN PATENTS 332,415  11/1935  Italy.

MILTON BUCHLER, Primary Examiner.

PAUL SAUBERER, Assistant Examiner.

U.S. Cl. X.R.

170—135.22; 244—7